US007624969B2

(12) United States Patent
Schletz et al.

(10) Patent No.: US 7,624,969 B2
(45) Date of Patent: Dec. 1, 2009

(54) TWO-STAGE INJECTOR-MIXER

(76) Inventors: Justin Schletz, 4995 Greenhaven St., Yorba Linda, CA (US) 92887; Maribel Arroyo, 5576 E. La Palma Ave., Anaheim, CA (US) 92807

( * ) Notice: Subject to any disclaimer, the term of this patent is extended or adjusted under 35 U.S.C. 154(b) by 438 days.

(21) Appl. No.: 11/604,448

(22) Filed: Nov. 27, 2006

(65) Prior Publication Data

US 2007/0069403 A1 Mar. 29, 2007

Related U.S. Application Data

(63) Continuation-in-part of application No. 10/955,668, filed on Sep. 30, 2004, now abandoned.

(51) Int. Cl.
*B01F 3/04* (2006.01)

(52) U.S. Cl. ...................... 261/36.1; 261/76; 261/79.2; 261/DIG. 75

(58) Field of Classification Search .................. 261/28, 261/29, 36.1, 37, 76, 77, 79.2, 126, DIG. 75
See application file for complete search history.

(56) References Cited

U.S. PATENT DOCUMENTS 3,624,985 A * 12/1971 Giles .......................... 95/219
3,997,631 A * 12/1976 Matsuoka et al. ............ 261/37
5,391,328 A * 2/1995 Ott et al. .................... 261/36.1
5,863,128 A * 1/1999 Mazzei ...................... 366/163.2
5,865,995 A * 2/1999 Nelson ....................... 210/205
6,076,811 A * 6/2000 Ziesenis ..................... 261/77
6,156,209 A * 12/2000 Kim ........................... 210/703
6,491,826 B1 * 12/2002 Helwig ....................... 210/703
7,097,160 B2 * 8/2006 Nelson ....................... 261/29
2002/0163089 A1 * 11/2002 La Crosse .................. 261/76
2003/0071372 A1 * 4/2003 Scherzinger et al. .......... 261/76
2007/0257381 A1 * 11/2007 Chuang ...................... 261/76

* cited by examiner

*Primary Examiner*—Scott Bushey
(74) *Attorney, Agent, or Firm*—Marcia A. Devon

(57) ABSTRACT

A compact, improved injector-mixer for injecting and thoroughly mixing fine bubbles of air into a contaminated water stream from a fish tank is disclosed. Water is pumped down through an injection section of the present invention where air is injected into the stream by an improved Venturi construction. The mixture then flows into an improved mixing section, vertically disposed within a protein skimmer chamber, where it is thoroughly mixed such that the plethora of small air bubbles have a greater chance to bond with the contaminants of the water, the contaminants becoming buoyant as a result. Upon introduction of the mixture into the protein skimmer chamber, the bubbles of air and contaminants attached thereto rise to the top of the protein skimmer column to be contained, while the filtered and oxygenated water is returned to the tank through a base of the protein skimmer chamber.

12 Claims, 3 Drawing Sheets

TWO-STAGE INJECTOR-MIXER

CROSS-REFERENCE TO RELATED APPLICATIONS

This is a continuation-in-part of application Ser. No. 10/955,668, filed on Sep. 30, 2004, and included herein by reference, which is now abandoned

STATEMENT REGARDING FEDERALLY SPONSORED RESEARCH AND DEVELOPMENT

Not Applicable.

FIELD OF THE INVENTION

The present invention relates generally to devices for mixing a gas into a liquid stream, and more particularly to an improved protein skimmer.

DISCUSSION OF RELATED ART

Protein skimmers for fish aquariums have advanced considerably over the years and are now the favored means of filtering fish tank water. A protein skimmer serves to both introduce very small air bubbles into the aquarium water so as to oxygenate the water for the benefit of the fish, and also to mix air bubbles into the water for the containment of pollutants in the water. Pollutants bond to the air molecules and as a result become buoyant and are then collected at a top area of the protein skimmer, while the filtered and oxygenated water is returned to the fish tank.

The efficiency of a protein skimmer may be measured by the volume of pollutants that are filtered from the water in a given period of time, divided by the power required by the water pump driving the protein skimmer. It is desirable to increase the efficiency of a protein skimmer so that a smaller water pump may be used to keep a fish aquarium clean, which not only saves on electricity costs of running the pump but also reduces the noise associated with running the fish tank.

The efficacy of a protein skimmer is increased as pollutants are exposed to a larger amount of air for a longer period of time. Therefore, the efficiency of a protein skimmer is increased when the air bubbles are smaller, increasing the surface area of the air with the surrounding water, and when the mixture of air and water are mixed vigorously with increased turbulence, which results in the pollutants having more opportunity for exposure and bonding with the air.

Prior art protein skimmers are generally of "downdraft" or"Venturi" type protein skimmers. Prior art downdraft type protein skimmers tend to require significant water pressure to operate effectively, and do not result in significantly turbulent water flow. Moreover, such prior art devices require a tall "downdraft" tube that is not often practical in a home environment. However, downdraft type protein skimmers do produce small air bubbles and used in limited environments, such as in retail pet stores and the like. "Venturi" type prior art protein skimmers can be more easily hidden from view than "downdraft" types, behind or under the fish tank, and do not require an inordinately tall downdraft tube. However, such prior art devices tend to clog with pollutants at the air injection point into the water stream, and do not produce as many bubbles as the downdraft type protein skimmers. For example, U.S. Pat. No. 5,863,128 to Mazzei teaches a Venturi type air injector that may be used with a protein skimmer apparatus.

Another prior art device, taught in U.S. Pat. No. 6,156,209 to Kim is intended to generate air bubbles with a high-pressure water injector into an auxiliary tank, and to increase the turbulence of the resulting mixture flow. However, such a device requires an auxiliary tank and takes up considerable space.

In my previous application, of which this application is a continuation-in-part, my design featured a horizontal mixing section projecting from a vertical protein skimmer column. However, it has been found that such a design is not as compact as is required in some installations, although it is suitable for home and hobby applications. Further, having the mixing section substantially perpendicular to the protein skimmer chamber results in a weaker seam where the mixing section is sealed with the protein skimmer chamber, such a seam being more prone to leaking and breaking if inadvertently impacted.

Therefore, there is a substantial need for an inexpensive and effective means by which to inject a substantial amount of small air bubbles into a water stream and cause the vigorous mixing of the air and water before introducing the air and water mixture into a protein skimmer chamber. The desired device should be efficient even when used with smaller sized, lower power water pumps, and the whole device should be of a small enough size to conceal behind a fish tank if desired as in a home environment, for example. Further, the ideal device would include an extremely small "footprint" and would not expose any weak seams that, if impacted, may leak. The present invention accomplishes these objectives.

SUMMARY OF THE INVENTION

The present invention is an injector and mixer for injecting a gas into a liquid stream, and then thoroughly mixing the gas and the liquid before introducing the mixture thereof into a protein skimmer chamber. The present invention generally comprises an injection section and a mixing section, and may further include the protein skimmer chamber integrated therewith. The injection section is designed to be the first stage of the mixing operation as well as injecting the mixture into the second stage mixing chamber.

With the liquid preferably being a mixture of water and pollutants from a fish tank, and with the gas preferably being air at ambient pressure, liquid flows down through the injection section of the present invention from, for example, a water pump, while drawing in the gas to form a mixture. The mixture then flows into the mixing section to be thoroughly mixed with a great multitude of tiny bubbles of gas that serve to bond with the pollutants in the liquid, the pollutants becoming buoyant as a result. Upon introduction of the mixture into the mixing chamber and the protein skimmer chamber, the bubbles of gas and pollutants attached thereto rise to a top of the protein skimmer chamber to be contained in a collection cup, while the filtered and oxygenated water is returned to the tank.

The injection section serves to inject and mix the gas into the liquid stream. The injection section comprises a hollow body with a first end and a second end. A flow passage is formed inside the body from the first end to the second end, and is preferably positioned with a longitudinal axis thereof oriented vertically such that the first end is above the second end.

The injector body defines several distinct portions along its length from the first end to the second end. The liquid inlet port at the first end is interconnected to a cylindrical entry portion. Liquid is introduced under pressure into the injection section through the inlet port at the first end and travels through the cylindrical entry portion, which is interconnected to a frustoconical nozzle portion, where the cross-sectional diameter of the nozzle portion reduces, preferably by at least forty percent, as the liquid moves therethrough. As such, the velocity and pressure of the liquid increases to a point where it exits the nozzle portion at a relatively high speed and in a coherent stream. The nozzle portion opens into a generally cylindrical injection portion, which includes an injection port interconnected to a gas inlet port which receives the gas through a gas conduit.

The high velocity of the liquid exiting the nozzle section of the injector body, pulls the gas through the gas injection port in a Venturi effect, whereupon the gas is injected into the liquid as the liquid leaves the injection portion and enters a frustoconical funnel portion of the injector body. The design of the injector body causes the liquid and gas to form a mixture which includes small air bubbles. The mixture of liquid and gas (water and air in the present application) is directed by the narrowing body in the funnel portion into a relatively short expanding portion (the expanding portion may also be frustoconical in a preferred embodiment). The expanding portion is connected to a cylindrical exit portion having a cross-sectional diameter preferably about twice that of the funnel portion at the expanding portion. As such, the pressure and velocity of the liquid-gas mixture is reduced as it exits the injector body compared to the velocity as the mixture exits the funnel.

The liquid-gas mixture travels through the exit portion of the injector body at the mixture outlet port at the second end of the injection body, and enters the second stage of the mixing process. The liquid-gas mixture enters a mixer section through a mixture inlet port. The mixture inlet port is connected to the mixture outlet port of the injection section through a connecting conduit. The mixing section a generally cylindrical chamber with an open end and a closed end. The mixing chamber extends through the cylindrical body from the open end and terminates at the closed end. The mixture inlet port enters the mixing chamber through the body immediately adjacent to the closed end and tangentially to the body. The mixture swirls around the mixing chamber in a turbulent vortex to promote greater exposure of the pollutants in the liquid with the gas. A plurality of vanes may further be included on an inside surface of the mixing section body, each vane for directing the mixture upward as the mixture rotates around the mixing section.

Preferably the mixing section is fully contained within the protein skimmer chamber and oriented such that a longitudinal axis thereof is generally vertical, the open end thereof being oriented above the closed end thereof with the closed end fixed to a bottom end of the protein skimmer chamber. The gas naturally tends to rise towards the open end of the mixing chamber and the larger bubbles separate from the liquid and float towards the top end of the protein skimmer chamber. Liquid with finely dissolved gas tends to flow out of the open end of the mixing section and then down towards a water outlet back to the tank. The bottom end of the protein skimmer chamber may be an enlarged, rectangular base, that also serves as a mounting base for the injection section and a water outlet pipe that terminates at the water tank.

The present invention provides a means for effectively mixing fine bubbles of air into a water stream without requiring a large water or air pump, a large downdraft column or the like. As the water outlet pipe and injection section can be placed vertically generally parallel to the protein skimmer chamber, the device is compact relative to other known designs and can be easily kept out of view while in use. Further, the design of the injection section which serves as a first stage in the mixing of the liquid and gas in conjunction with a second stage mixing section being contained within the protein skimmer chamber results in a highly efficient water purification and oxygenation system.

The size of the unit can be easily scaled up or down for any particular size fish tank. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
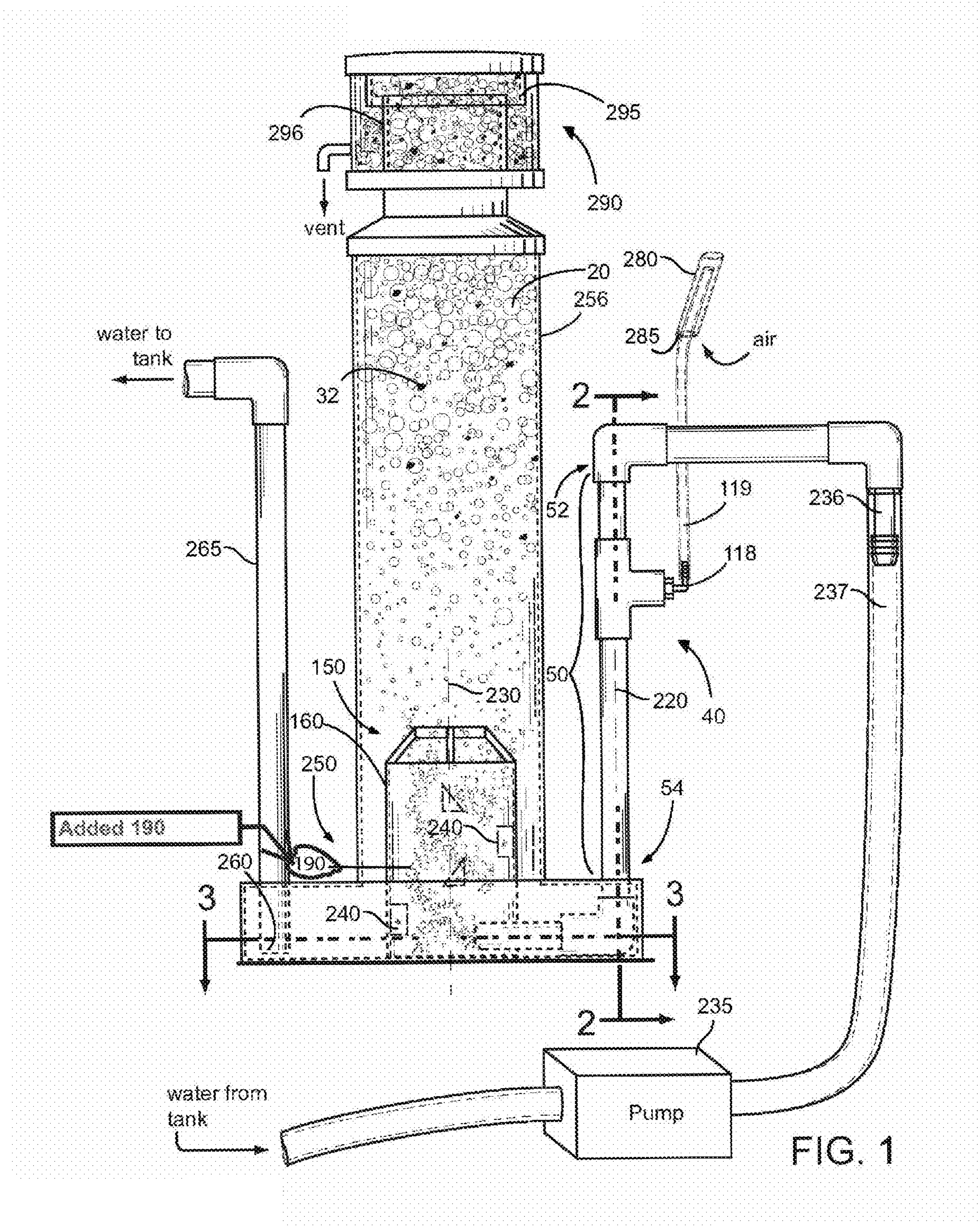
FIG. 1 is a front elevational view of the invention, illustrating an injector-mixer of the present invention as integrated into a protein skimmer chamber.

The present invention is an injector and mixer 10 for injecting a gas 20 into a liquid stream 30, and then thoroughly mixing the gas 20 and the liquid 30 before introducing the mixture thereof into a protein skimmer chamber 250. FIG. 1 illustrates the mixer 10, which generally comprises an injection section 40 and a mixing section 150, and may further include the protein skimmer chamber 250 integrated therewith. With the liquid 30 preferably being a mixture of water and pollutants 32 from a fish tank (not shown), and with the gas 20 preferably being air at ambient pressure, liquid 30 flows down through the injection section 40 of the present invention while drawing in the gas 20, forming a mixture 35. The mixture 35 then flows into the mixing section 150 to be thoroughly mixed with a great multitude of tiny bubbles of gas 20 that serve to bond with the pollutants 32 in the liquid 30, the pollutants 32 becoming buoyant as a result. Upon introduction of the mixture 35 into the mixing chamber 150 and the protein skimmer chamber 250, the bubbles of gas 20 and pollutants 32 attached thereto rise to a top 256 of the protein skimmer chamber 250 to be contained in a collection cup 290, while the filtered and oxygenated water 30 is returned to the tank.

The collection cup 290 is preferably a transparent cylinder and may further include a cylindrical column 296, and a larger cylindrical shroud 295. The bubbles of gas 20 and pollutants 32 are forced over a top edge of the column 296 and down into the cup 290 by the shroud 295. As the cup 290 is transparent, the need to wash the cup 290 will be evident upon visual inspection. A vent may further be included to bleed the gas 20 from the cup 290, or to attach an auxiliary container (not shown) for greater storage capacity of the pollutants 32.

Figure 2:
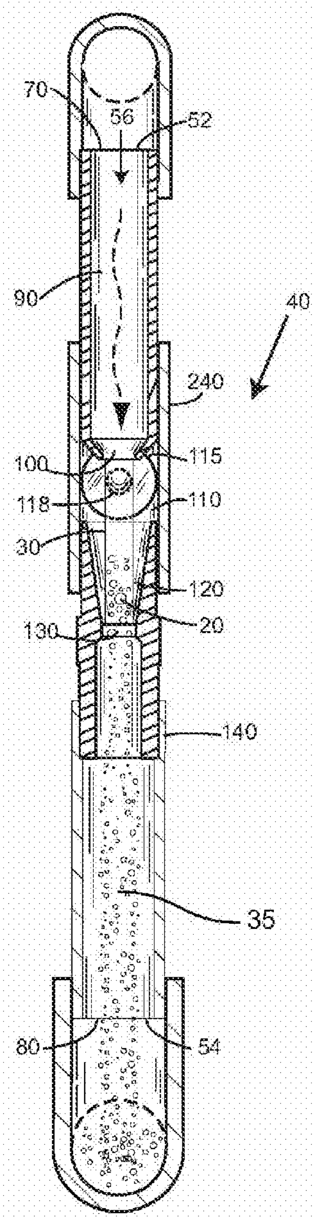
FIG. 2 is a cross-sectional view of an injection section of the invention, taken generally along lines 2-2 of FIG. 1.

The injection section 40 serves to inject the gas 20 into the liquid stream 30. The injection section 40 comprises a body 50 with a first end 52 and a second end 54. A flow passage 56 is formed through the body 50 from the first end 52 to the second end 54 (FIG. 2). Such a body 50 may be formed from PVC or ABS plastic, or the like, and is preferably positioned with a longitudinal axis 220 thereof oriented vertically such that the first end 52 is above the second end 54.

The body 50 defines several distinct elements along its length from the first end 52 to the second end 54. The liquid inlet port 70 at the first end 52 of the body 50 is interconnected to a cylindrical entry portion 90 (FIG. 2). Liquid 30 from, for example, a fish tank pump 235 is introduced under pressure into the injection section 40 through the inlet port 70 at the first end 52. Such an inlet port 70 may be fluidly interconnected with a water pump hose 237 (FIG. 1) or the like through any suitable means known in the prior art, such as a hose fitting 236. The liquid 30 travels through the cylindrical entry portion 90, which is interconnected to a frustoconical nozzle portion 100, where the cross-sectional diameter of the nozzle portion 100 reduces, preferably by at least forty percent, as the liquid 30 moves therethrough. As such, the velocity and pressure of the liquid 30 increases to a point where it exits the nozzle portion 100 at a relatively high speed and in a coherent stream.

The nozzle portion 100 opens into a generally cylindrical injection portion 110, which includes an injection port 115 interconnected to a gas inlet port 118 which receives in the preferred embodiment, ambient air 20 through a gas conduit 119. Preferably the nozzle portion 100 extends at least partially into the projection of the injection port 115 into the injection portion 110 as best illustrated in FIG. 2. The nozzle portion 100 is shown in FIG. 2 as slightly overlapping the injection port 115 in cross-section. Preferably the gas conduit 119 terminates at the opposite end of the gas inlet port 118. A muffler 280 is provided in the preferred embodiment, as shown in FIG. 1, which includes a plurality of air holes 285 through which the gas 20 enters at a relatively lower velocity so as not to produce a whistling sound. The muffler 280 may be made as an elongated cap having a closed end and an open end, the open ending including the plurality of air holes 285, as illustrated. Other mufflers 280 may be used as are known in the art, such as those including a fibrous material such as cotton or the like.

Figure 3:
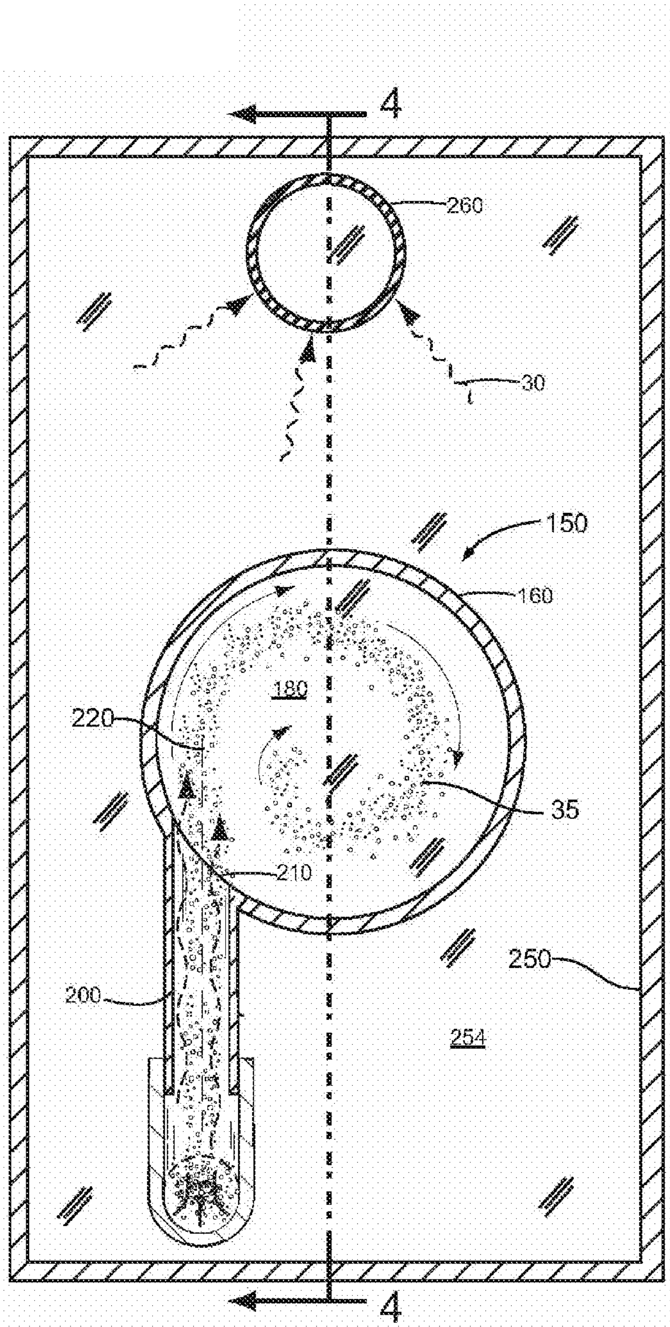
FIG. 3 is a cross-sectional view of a mixing section of the invention, taken generally along lines 3-3 of FIG. 1.

The high velocity of the liquid 30 exiting the nozzle section 100 pulls the gas 20 through the gas injection port 115 in a Venturi effect, whereupon the gas 20 is injected into the liquid 30 as the liquid 30 leaves the injection portion 110 and enters a frustoconical funnel portion 120, itself being interconnected to the injection portion 110. The liquid 30 and gas 20 form the mixture 35 that is directed by the narrowing body 50 in the funnel portion 120 into a relatively short frustoconical expanding portion 130, which is interconnected to a cylindrical exit portion 140 having a cross-sectional diameter preferably about twice that of the funnel portion 120 at the expanding portion 130. As such, the pressure and velocity of the liquid-gas mixture 35 is reduced. However, preferably the cross-sectional diameter of the entry portion 90 is at least fifteen percent greater than that of the exit portion 140, so that the velocity of the mixture 35 is great enough to promote more thorough mixing in the subsequent mixing portion 150. The liquid-gas mixture 35 exits the exit portion 140 at the mixture outlet port 80 at the second end 54 of the injection section 40, and enters the mixing section 150 at a mixture inlet port 210 thereof, the mixture inlet port 210 being interconnected to the mixture outlet port 80 of the injection section 40 through a connecting conduit 200 (FIG. 3).

In the preferred embodiment of the invention, the cross-sectional diameter of the nozzle portion 100 at the injection portion 110 is at least half of the cross-sectional diameter of the injection portion 110. Further, the cross-sectional diameter of the gas injection port 115 is generally the same as that of the injection portion 110. As such, ample gas 20 flow is possible completely around the stream of liquid 30 as the stream of liquid 30 exits the nozzle section 90, providing greater efficiency in injecting the gas 20 into the liquid stream 30.

Also in the preferred embodiment of the invention, the funnel section 120 is preferably at least fifty percent longer than the cross-sectional diameter of the funnel section 120 at the injection section 110. As such, the body 50 at the funnel section 120 forms only a slight angle with respect to the central axis of the funnel section 120, providing a greater distance in which to allow the injection of the gas 20 into the liquid 30. Such an elongated funnel section 120 further provides less chance for any liquid 30 that becomes separated from the stream of liquid 30 to be deflected anywhere but into the subsequent expanding portion 130. The cross-sectional diameter of the funnel portion 120 at the expanding portion 130 is preferably the same as or only slightly larger than the cross-sectional diameter of the nozzle portion 100 at the injection portion 110, as same needs to accommodate the mixture 35 of liquid 30 and the more compressible gas 20, while still forcing the gas 20 to be finely injected into the liquid 30.

The mixing section 150 comprises a generally cylindrical body 160 with an open end 170 and a closed end 180. A mixing chamber 190 extends through the cylindrical body 160 from the open end 170 and terminates at the closed end 180. The mixture inlet port 210 enters the mixing chamber 190 through the body 160 immediately adjacent to the closed end 180 and tangentially to the body 160 (FIG. 3). As such the mixture 35 swirls around the mixing chamber 190 in a turbulent vortex to promote greater exposure of the pollutants in the liquid 30 with the gas 20. The mixing section 150 is preferably formed from a PVC or acrylic pipe, or the like, that is several times larger in diameter than the body 50. A plurality of vanes 240 may further be included on an inside surface 165 of the mixing section body 160, each vane 240 for directing the mixture 35 upward as the mixture 35 rotates around the mixing section 150 (FIG. 4).

Preferably the mixing section 150 is fully contained within the protein skimmer chamber 250 and oriented such that a longitudinal axis 230 thereof is generally vertical, the open end 170 thereof being oriented above the closed end 180 thereof with the closed end 180 fixed to a bottom end 254 of the protein skimmer chamber 250. As such, the gas 20 naturally tends to rise towards the open end 170 by gravity, the larger bubbles separating from the liquid 30 and floating towards the top end 256 of the protein skimmer chamber 250. Liquid 30 with finely dissolved gas 20 tends to flow out of the open end of the mixing section 150 and down towards a water outlet 260 of the protein skimmer chamber 250 (FIG. 4). The bottom end 254 of the protein skimmer chamber 250 may be an enlarged, rectangular base 258, that also serves as a mounting base for the injection section 40 and the a water outlet pipe 265 that terminates at the water outlet 260. The base 258 may be made from acrylic, PVC, or other suitably rigid material.

Figure 4:
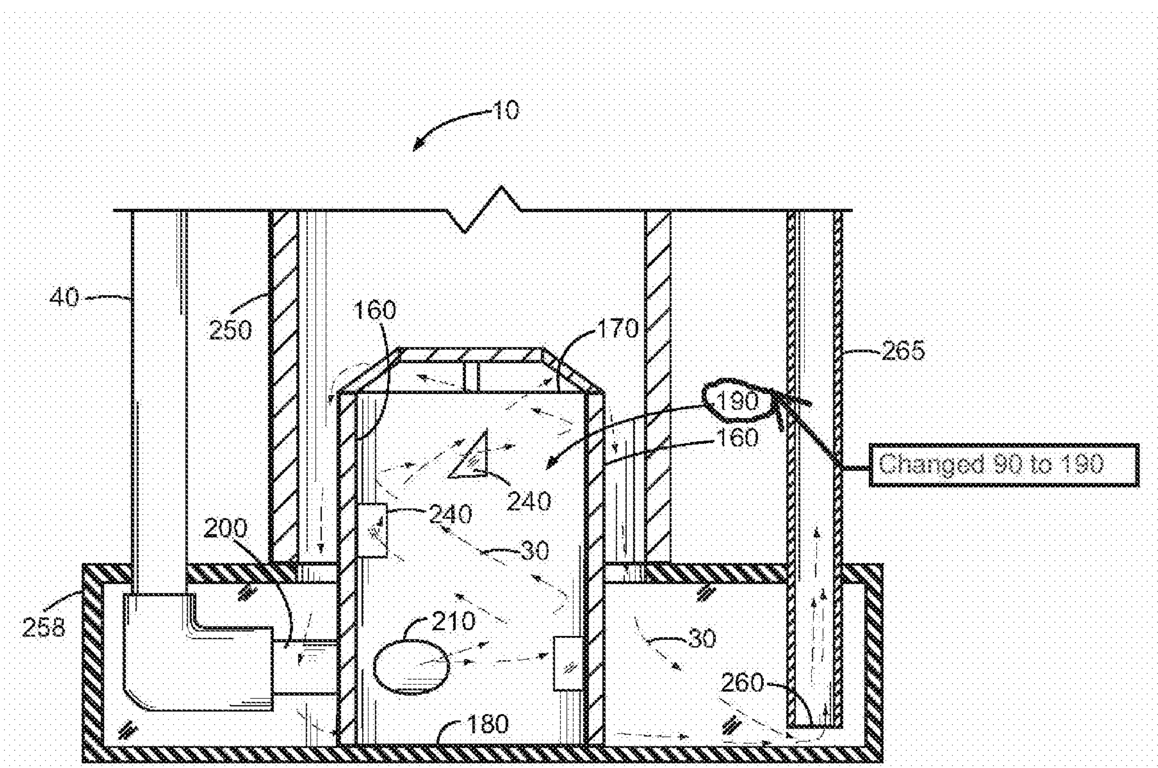
FIG. 4 is a cross-sectional view of a mixing section of the invention, taken generally along lines 4-4 of FIG. 3.

In FIGS. 1, 3, and 4, for visual clarity, the water outlet pipe 265 and the injection section 40 are shown mounted to the base 258 on either side of the protein skimmer chamber 250. However, the preferred mode of the invention has both the water outlet pipe 265 and the injection section 40 mounted proximate each other, on essentially the same side of the protein skimmer chamber 250 such that plumbing connections can be made conveniently on the same side of the protein skimmer chamber 250. This also results in the advantage of having the vertical protein skimmer chamber 250 visually in front of the somewhat unaesthetic outline pipe 265 and the injection section 40. The water outlet pipe 265 rises upward high enough so as to more easily allow for water entry back into a fish tank, for example. The water outlet pipe 265 and the liquid inlet port 70 of the injection section may each have swivel-type adjustable fittings (not shown) for flexibility when hooking up other plumbing fixtures.

While a particular form of the invention has been illustrated and described, it will be apparent that various modifications can be made without departing from the spirit and scope of the invention. For example, the exact relatively lengths of the various sections 90,100,110,120,130 and 140 may be slightly modified, or the materials used may be substituted with similarly rigid materials such as acrylic or the like. Accordingly, it is not intended that the invention be limited, except as by the appended claims.

What is claimed is:

1. An apparatus for injecting a gas into a liquid and for mixing the gas with the liquid, the apparatus comprising:

an injection section comprising a hollow, generally cylindrical body having a first and a second end forming a flow passage inside said body from said first to said second end, a liquid inlet port at said first end, and a mixture outlet port at said second end, said injection section further including:

a generally cylindrical entry portion interconnected to the liquid inlet port;

a frustoconical nozzle connected to said entry portion;

a generally cylindrical injection portion interconnected to said nozzle and further including an injection port traversing said injection portion, a gas inlet port connected to said injection portion;

a gas conduit adapted to connect said gas inlet port with said injection portion;

a frustoconical funnel interconnected to the injection portion;

an expanding portion interconnected to the frustoconical funnel;

a generally cylindrical exit portion interconnecting the expanding portion to the mixture outlet port; and a mixing section, adapted to mix the gas and the liquid and to maximize the production of bubbles, said mixing section comprising a generally hollow, cylindrical body having an open end and a closed end, a mixing chamber extending from said open end and terminating at said closed end, said mixing section including a mixture inlet port entering said mixing chamber through said body immediately adjacent to said closed end, a central axis of the mixture inlet port being substantially tangential to the body, and a conduit connecting said mixture inlet port of said mixing section with said mixture outlet port of said injection section.

2. The apparatus of claim 1 wherein the injection section is oriented such that a longitudinal axis thereof is generally vertical, the first end thereof being oriented above the second end thereof.

3. The apparatus of claim 1 wherein the cross-sectional diameter of the nozzle portion at the entry portion is at least twice the cross-sectional diameter of the nozzle portion at the injection portion.

4. The apparatus of claim 1 wherein the cross-sectional diameter of the nozzle portion at the injection portion is at least half of the cross-sectional diameter of the injection portion.

5. The apparatus of claim 1 wherein the funnel section is at least fifty percent longer than the cross-sectional diameter of the nozzle section at the injection section.

6. The apparatus of claim 3 wherein the cross-sectional diameter of the nozzle portion at the injection portion is generally the same size as the cross-sectional diameter of funnel portion at the expanding portion.

7. The apparatus of claim 1 wherein the cross-sectional diameter of the entry portion is at least fifteen percent greater than the cross-sectional diameter of the exit portion.

8. The apparatus of claim 5 wherein the nozzle portion extends at least partially across the projection of the injection port into the injection portion.

9. The apparatus of claim 1 wherein the mixing section is oriented such that a longitudinal axis thereof is generally vertical, the open end thereof being oriented above the closed end thereof, such that the gas naturally tends to rise towards the open end by gravity.

10. The apparatus of claim 9 wherein the mixing section further includes a plurality of vanes on an inside surface of the wall thereof, each vane for directing the mixed gas and liquid upward as the mixed gas and liquid rotates around the mixing section.

11. The apparatus of claim 9 further including a substantially hollow protein skimmer chamber, the mixing section being fixed to a bottom end thereof a water outlet port of the protein skimmer chamber positioned proximate the bottom end thereof, whereby a substantial portion of the gas tends to separate within the mixing section and at the open end of the mixing section, the gas generally rising to a top end of the protein skimmer chamber and the liquid generally flowing towards the water outlet port of the protein skimmer chamber.

12. The apparatus of claim 1 wherein the gas inlet port includes a muffler covering the gas inlet port.

* * * * *